Aug. 23, 1932.   L. GOLDHAMMER   1,873,927
FOLDING CAMERA
Filed Nov. 6, 1930   2 Sheets-Sheet 2
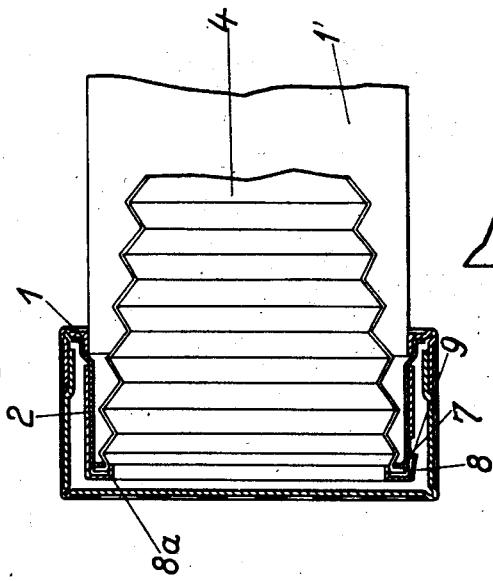
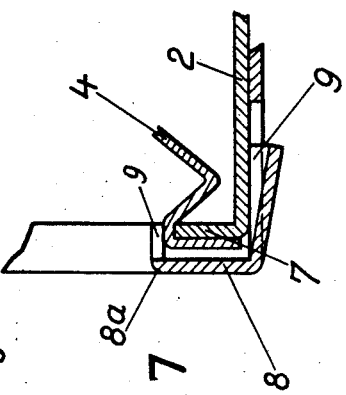
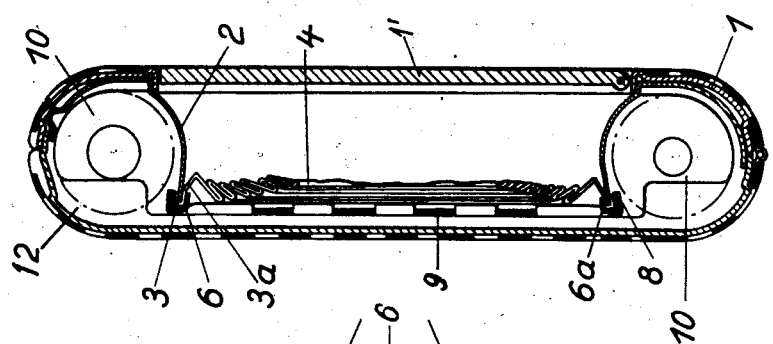
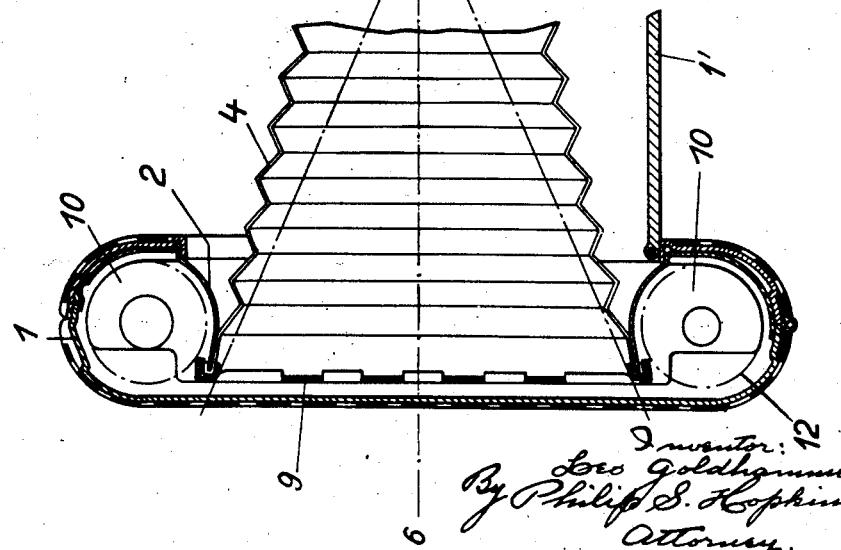

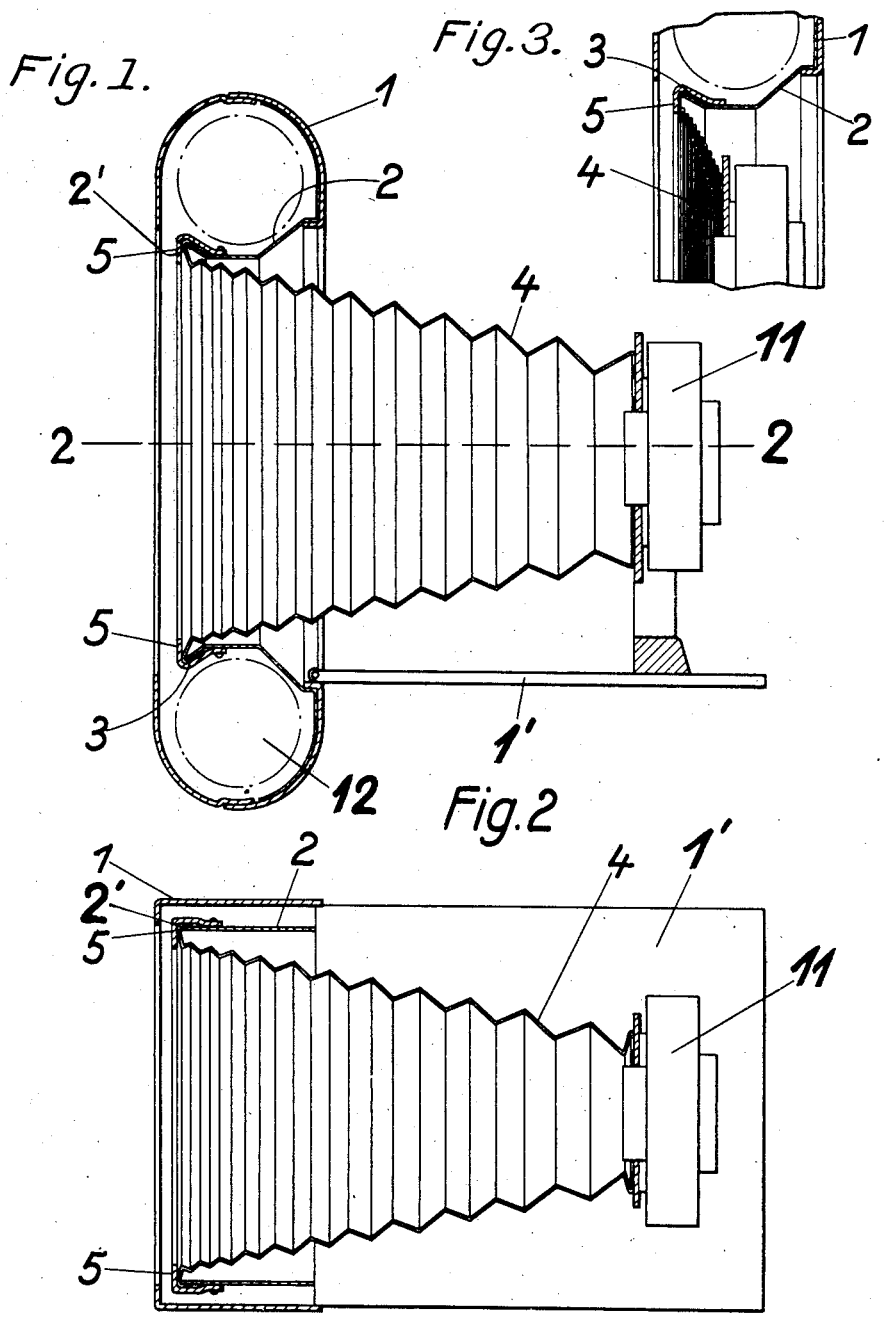

Patented Aug. 23, 1932

1,873,927

UNITED STATES PATENT OFFICE

LEO GOLDHAMMER, OF MUNICH, GERMANY, ASSIGNOR TO AGFA ANSCO CORPORATION, OF BINGHAMTON, NEW YORK, A CORPORATION OF NEW YORK

FOLDING CAMERA

Application filed November 6, 1930, Serial No. 493,840, and in Germany October 10, 1929.

The present invention relates to photographic folding cameras and more particularly to a new method of fastening the bellows to the camera casing.

One of its objects is to prevent the bellows of the camera from becoming brittle and from bursting at the places where they are agglutinated on the body of the camera.

According to my invention for this purpose the last fold of the bellows, opposite to the objective, is put from outside over the inner casing of the camera and fastened on the outer surface thereof. Thus, the strain to which the bellows are exposed when pulled forward at the places where they are fastened to the camera, is wholly received by the edge of the inner casing of the camera and the glued part of the fold is in no way affected. In order to obtain in this way of fastening the bellows a sharp bordering of the images, angled moulding strips are fitted over the borders of the bellows glued to the body of the camera, in such a way as to project the fold of the bellows and, at the same time, to securely fasten the latter.

For further reducing the dimensions of the camera-box, the bellows are so arranged and constructed that the first pliable fold lies close against the walls of the spool chamber of the inner casing of the camera and gives way to such an extent that the succeeding folds of the bellows, when collapsed, fit very closely one into another thus taking a very small space only. For guiding the film a covering frame is arranged over the places where the bellows are fastened which frame, carries the rolls for guiding the film and comprises lateral perforations for the passage of the air into and from the bellows. Preferably, the covering frame extends both upwards and downwards so that it may at the same time serve as a carrier for the spools.

In the drawings:—

Fig. 1 is a longitudinal section of a folding camera constructed in accordance with and illustrating one embodiment of my invention, the same being extended for use.

Fig. 2 is a horizontal section thereof.

Fig. 3 is a fragmentary view and shows a section illustrating the new fastening of the bellows on the inner casing and the position of the bellows in the closed camera.

Fig. 4 is a longitudinal section of a folding camera extended for use illustrating another embodiment of my invention.

Fig. 5 is a longitudinal section through the closed camera.

Fig. 6 is a horizontal section of the camera on line 6—6 of Fig. 4.

Fig. 7 shows in detail on an enlarged scale the arrangement of the perforations for the passage of air into or from the bellows.

Similar reference numerals throughout the several views indicate the same parts.

So far as the general characteristics of the camera are concerned, it may be of the usual folding or pocket type comprising a body 1 having an opening at the front provided with a door 1' which, when extended provides a bed as shown in Figs. 1 and 2. On this bed operates a front 11 connected to the body by a bellows 4. In the camera body 1 there is arranged in known manner the inner casing 2 forming the film chambers 12 and enclosing light-tightly the light sensitive film when the camera is extended for use.

According to this invention, the end of the bellows 4 opposite to the objective is fastened in such a manner that the last fold of the bellows 3 is fitted from outside over the inner casing 2 of the camera and sized and clamped or otherwise fastened to the outer surface of the inner casing of the camera. (See Fig. 3.) For the purpose of fastening the edges of the bellows in this way, the back frame of the inner casing of the camera has to be dispensed with. In the present case the pictures are bordered by angled mouldings 5 fastened at the four edges 2' of the inner casing 2 of the camera 1. By covering the sized end of the bellows, the said mouldings 5, at the same time, securely fasten the bellows. The described way of fastening ensures perfect lighttightness, solidity and fastness in construction and permits a compact construction of the camera which is still considerably enhanced by the fact that the folds of the bellows 4 decrease in depth the nearer they are to the back of the camera. In the case of the camera represented by Figs. 4–7, the upper and lower border of the last folds 3a of the bellows is fitted over the free ends of the inner casing 2 and fastened thereon by means of clamps 6 and closed in a light-tight manner. The lateral borders of the last fold are glued on to an angular flange 7 of the inner casing of the camera. The pictures are laterally bordered by the edges 8a of a covering frame 8 which fits over the places where the bellows are fastened. The upper and lower bordering of the image is effected by the edges 6a of the clip 6. In order to permit a good passage of the air into or out of the interior of the camera when the bellows are extended or collapsed, the covering frame 8 is provided with lateral openings 9 extending in the form of canals into the interior of the bellows. The lateral flanges 10 of the covering frame 8 extending upwards and downwards are constructed so as to serve as spool holders. As can be seen by the dash and dot lines in Fig. 4, the construction and the way of fastening the bellows allow of manufacturing the camera, while leaving the size of the picture window unaltered, in extremely small and compact dimensions, since the first fold of the bellows lying closely against the walls of the spools in no way affect the passage of the rays and the succeeding folds, on collapsing of the camera, can easily be pushed back to the end of the bellows.

What I claim is:—

1. In a folding camera the combination with a body and an inner casing forming the spool chambers, of a bellows bent on its end farthest from the objective over the edges of the inner casing and fastened thereon on the rear side within the spool chambers and at the outer surface of the inner casing by mechanical means.

2. In a folding camera the combination with a body and an inner casing forming the spool chambers, of a bellows bent on its end farthest from the objective over the edges of the inner casing and fastened thereon on the rear side within the spool chambers and at the outer surface of the inner casing by angled mouldings forming simultaneously a frame for the picture field.

3. In a folding camera the combination with a body and an inner casing forming the spool chambers, of a bellows bent on its end farthest from the objective over the edges of the inner casing and securely fastened thereon on the rear side within the spool chambers and at the outside of the inner casing by U-shaped mouldings forming simultaneously a frame for the picture field.

4. In a folding camera the combination with a body and an inner casing forming the spool chambers, of a bellows bent on its end farthest from the objective over the edges of the inner casing and fastened thereon on the rear side within the spool chambers and at the outer surface of the inner casing by mechanical means, the first pliable fold of the said bellows near the inner casing lying in the opened camera with its whole length against the outer surface of the spool chambers.

5. In a folding camera the combination with a body and an inner casing forming the spool chambers, of a bellows bent on its end farthest from the objective over the edges of the inner casing and fastened thereon on the rear side within the spool chambers and at the outer surface of the inner casing by mechanical means, the different folds of the bellows gradually decreasing in the neighborhood of the back of the camera.

6. In a folding camera the combination with a body and an inner casing forming the spool chambers, of a bellows bent on its end farthest from the objective over the edges of the inner casing and securely fastened thereon on the rear side within the spool chambers and at the outside of the inner casing by a frame of U-shaped mouldings forming simultaneously a frame for the picture field, said frame being provided with light-tight openings.

7. In a folding camera the combination with a body and an inner casing forming the spool chambers, of a bellows bent on its end farthest from the objective over the edges of the inner casing and securely fastened thereon on the rear side within the spool chambers and at the outside of the inner casing by a frame of U-shaped mouldings forming simultaneously a frame for the picture field, said frame being provided with light-tight openings, and with flanges serving as carriers of the film spools.

In testimony whereof, I affix my signature.

LEO GOLDHAMMER.